(12) United States Patent  
Ayrapetian et al.

(10) Patent No.: US 9,286,883 B1
(45) Date of Patent: Mar. 15, 2016

(54) ACOUSTIC ECHO CANCELLATION AND AUTOMATIC SPEECH RECOGNITION WITH RANDOM NOISE

(71) Applicant: Amazon Technologies, Inc., Reno, NV (US)

(72) Inventors: Robert Ayrapetian, Morgan Hill, CA (US); Bjorn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 14/038,319

(22) Filed: Sep. 26, 2013

(51) Int. Cl.
*H04B 3/20* (2006.01)
*G10K 11/178* (2006.01)

(52) U.S. Cl.
CPC ..................... *G10K 11/178* (2013.01)

(58) Field of Classification Search
CPC .......... H04M 9/82; H04M 9/08; H04M 9/085
USPC ............ 381/66, 83, 93, 95–96; 704/226, 233; 379/406.03, 406.08
See application file for complete search history.

(56) References Cited

U.S. PATENT DOCUMENTS

| | | | | |
|---|---|---|---|---|
| 8,045,701 | B2 * | 10/2011 | Erving et al. | 379/388.02 |
| 2008/0219431 | A1 * | 9/2008 | Liu | H04M 9/082 379/406.01 |
| 2008/0317256 | A1 * | 12/2008 | Bachmann | G10K 11/1782 381/71.11 |
| 2010/0183163 | A1 * | 7/2010 | Matsui et al. | 381/66 |
| 2011/0116644 | A1 * | 5/2011 | Beaugeant | H04M 9/082 381/66 |
| 2011/0150067 | A1 * | 6/2011 | Takada | 375/227 |

* cited by examiner

*Primary Examiner* — Disler Paul
(74) *Attorney, Agent, or Firm* — Knobbe, Martens, Olson & Bear, LLP

(57) ABSTRACT

Features are disclosed for performing acoustic echo cancellation using random noise. The output may be used to perform speech recognition. Random noise may be introduced into a reference signal path and into a microphone signal path. The random noise introduced into the microphone signal path may be transformed based on an estimated echo path and then combined with microphone output. The random noise introduced into the reference signal path may be combined with a reference signal and then transformed. In some embodiments, the random noise in the reference signal path may be used in the absence of another reference signal, allowing the acoustic echo canceler to be continuously trained.

23 Claims, 5 Drawing Sheets

ACOUSTIC ECHO CANCELLATION AND AUTOMATIC SPEECH RECOGNITION WITH RANDOM NOISE

BACKGROUND

Natural language processing systems include various modules and components for receiving input from a user (e.g., audio, text, etc.) and determining what the user meant. In some implementations, a natural language processing system includes an automatic speech recognition ("ASR") module that receives audio input of a user utterance and generates one or more likely transcriptions of the utterance. Automatic speech recognition modules typically include an acoustic model and a language model. The acoustic model is used to generate hypotheses regarding which subword units (e.g. phonemes or triphones) correspond to an utterance based on the acoustic features of the utterance. The language model is used to determine the most likely transcription of the utterance based on the hypotheses generated using the acoustic model and lexical features of the language in which the utterance is spoken.

Many devices configured to obtain audio data of user utterances include both a loudspeaker and a microphone. The loudspeaker is used to play audio signals, such as speech from a remote source during a telephone call, audio content presented from local storage or streamed from a network etc. The microphone is used to capture audio signals from a local source, such as a user speaking voice commands or other utterances. An acoustic echo occurs when the remote signal emitted by the loudspeaker is captured by the microphone, after undergoing reflections in the local environment.

An acoustic echo canceller ("AEC") may be used to remove acoustic echo from an audio signal captured by a microphone in order to facilitate improved communication. The AEC typically filters the microphone signal by determining an estimate of the acoustic echo (e.g., the remote audio signal emitted from the loudspeaker and reflected in the local environment). The AEC can then subtract the estimate from the microphone signal to produce an approximation of the true local signal (e.g., the user's utterance). The estimate is obtained by applying a transformation to a reference signal that corresponds to the remote signal emitted from the loudspeaker. The transformation is typically implemented using an adaptive algorithm. Adaptive transformation relies on a feedback loop, which continuously adjusts a set of coefficients that are used to calculate the estimated echo from the far-end signal. Different environments produce different acoustic echoes from the same loudspeaker signal, and any change in the local environment may change the way that echoes are produced. By using a feedback loop to continuously adjust the coefficients, an AEC to can adapt its echo estimates to the local environment in which it operates.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
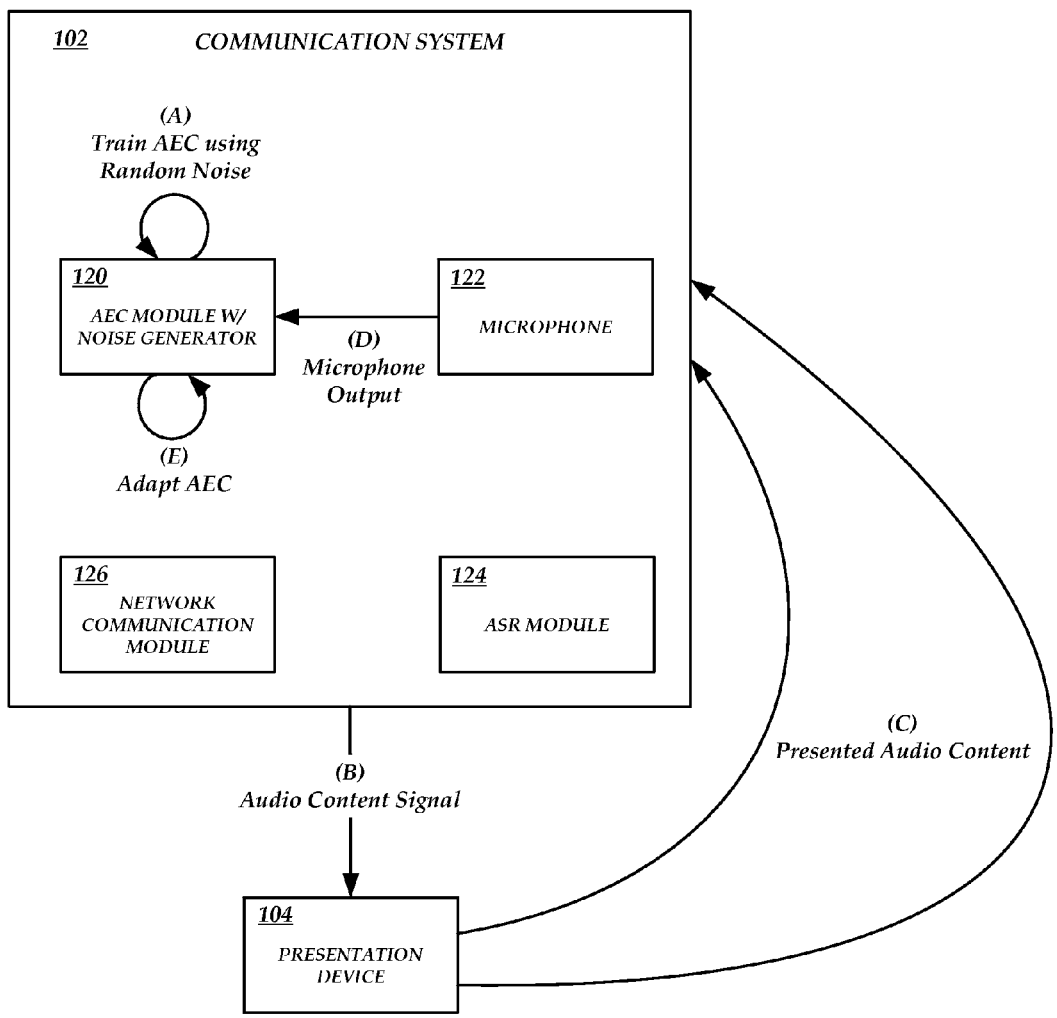
FIG. 1 is a block diagram of illustrative data flows and operations of an acoustic echo canceller configured to operation with random noise.

Communication devices, such as telephones and computing devices that present audio output and accept spoken input, may receive an acoustic echo of audio output in combination with spoken input. To a consumer of the spoken input, such as another party to a telephone call or an automatic speech recognition system, the acoustic echo can interfere with spoken input and make it difficult to understand. Devices often include acoustic echo cancellers ("AECs") that attempt to remove acoustic echo from audio input, leaving only the spoken input (and environmental noise). AECs use a reference signal representing the audio signal that is output through a loudspeaker in order to determine what to remove from the signal input through the microphone. For example, when a telephone call is conducted using a speaker phone, the signal from the other party (or parties) received by the speaker phone is used as the reference signal. Acoustic reflections in the local environment can alter the speaker playback of the reference signal before it is captured by the microphone. Therefore, AECs typically include adaptive filters which transform the internal representation of the reference signal according to the acoustic reflections caused by the local environment. Without access to a reference signal, the AEC cannot filter audio input received from a microphone because it has no knowledge of what sounds should be filtered and what sounds should be preserved. In addition, the adaptive filter of the AEC cannot be properly trained without a reference signal because it has nothing to compare to the microphone input. Furthermore, even well-trained AECs tend to leave residual noise (e.g., ambient noise from the room, or residual noise due to imperfections in the echo cancellation) that may interfere with downstream consumers of microphone input, such as automatic speech recognition systems. An additional problem with least mean squares ("LMS") algorithms typically used in the adaptive filters of AECs is their slow convergence given an input signal that includes colored noise. For input signals that include white noise, on the other hand, LMS algorithms yield satisfactory performance. Many different algorithms attempt to deal with this problem, all of which, in some fashion, use de-correlation techniques for whitening the input.

Aspects of the present disclosure relate to introducing random noise into an AEC reference signal path and a corresponding microphone path. By providing random noise to an AEC, the AEC may continue to have a signal on which to perform echo cancellation and filter adaptation even when a reference signal is not active or is otherwise not available. The random noise can also be combined with audio input from a microphone so that the AEC can cancel the random noise even when the local environment is silent or otherwise in a state of low noise. As a result, the AEC may be continuously trained, and acoustic echo cancellation may remain within a satisfactory performance state, also known as being converged. AECs may experience an error rate outside of a satisfactory rate, a state known as being diverged, when acoustic properties of a local environment change and the AEC has not yet been trained on the updated acoustic properties. The acoustic properties of an environment may change when, e.g., people enter, leave, or move around in an environment, doors and windows are opened or closed, etc. Without a reference signal, a conventional AEC cannot be trained in such circumstances. Accordingly, conventional AECs cannot remain converged. By providing random noise in the reference signal path and also in the microphone path, the adaptive filter of the AEC may remain trained and converged because it remains active.

Additional aspects of the present disclosure relate to using automatic speech recognition ("ASR") on signals from AECs that add random noise, such the AECs described above and in greater detail below. Maintaining a trained AEC that is converged may be particularly important for applications in which a device may be addressed through spoken commands without first activating speech recognition non-verbally (e.g., by pressing a button). For example, some systems are configured to continuously "listen" for a particular word or phrase indicating that a user is addressing the system. An AEC that is continuously converged can ensure that a truer signal is provided to an ASR system or specialized keyword spotter. In addition, speech recognition on audio signals that include known noise may be more accurate than speech recognition on audio signals that include unknown noise. For example, the ASR system may use an acoustic model that is trained using the specific type of random noise that is used in the AEC. Some amount of the random noise typically remains in the speech signal that is provided by the AEC to the ASR system, even after echo cancellation. The residual random noise may be desirable due to its ability to cover up AEC errors and artifacts, environmental noise, etc. When processed using an acoustic model that is trained to produce accurate results in the presence of the known random noise, ASR results can be more accurate in a wider range of acoustic environments.

Further aspects of the disclosure relate to controlling the random noise that is added into the AEC and microphone path. In some embodiments, an ASR system can identify or provide the random noise that works best with the particular ASR system (e.g., the acoustic model was trained on data that included a particular noise). A noise generator of the communication device can be configured to generate the noise identified by the ASR system. For example, the ASR system may provide a recording, an index to a list of predefined noises, or the like. In some embodiments, the volume of noise added into the microphone path can be dynamically determined based on the microphone output. For example, if the sound coming in through the microphone is soft, then the volume of random noise added to the microphone may be lower than, e.g., if the sound coming in through the microphone is very loud. Using lower-levels of random noise can prevent or reduce the risk of obscuring desirable low-level sounds (e.g., soft speech in a quiet room). User higher levels of random noise can obscure undesirable high-level sounds (e.g., loud environmental noise).

Although aspects of the embodiments described in the disclosure will focus, for the purpose of illustration, using noise generating in AEC to improve local ASR, one skilled in the art will appreciate that the techniques disclosed herein may be applied to any number of processes or applications performing automatic speech recognition. For example, a local device may include an AEC and noise generator, but the AEC output may be transmitted over a network to a remote ASR system. Various aspects of the disclosure will now be described with regard to certain examples and embodiments, which are intended to illustrate but not limit the disclosure.

Communication System Environment

Figure 2:
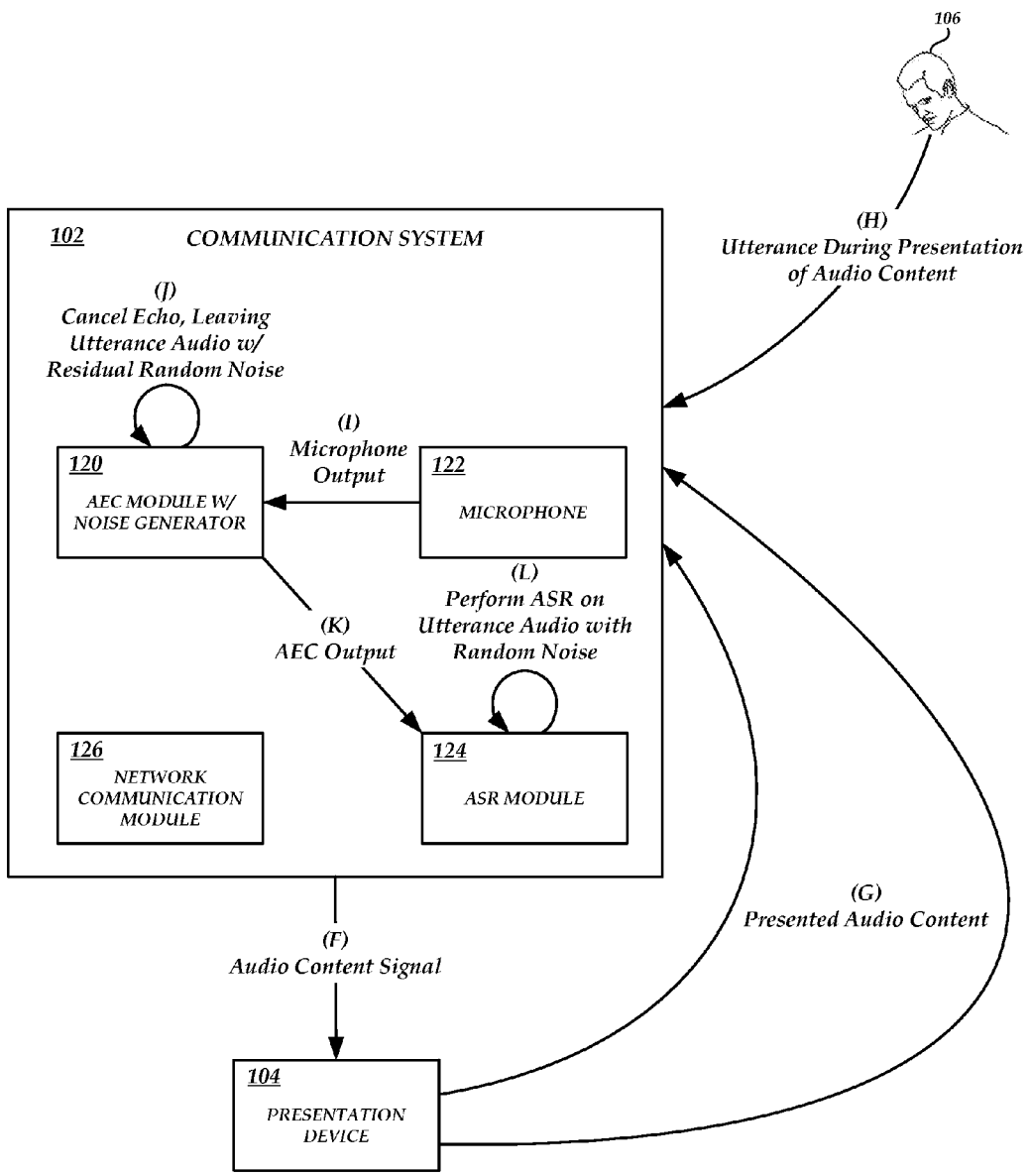
FIG. 2 is a block diagram of illustrative data flows and operations of an acoustic echo canceller configured to add random noise and produce output for use in automatic speech recognition.

With reference to an illustrative embodiment, FIGS. 1 and 2 show example interactions and data flows between communication system 102, a presentation device 104, and a user 106.

The communication system 102 can correspond to a wide variety of electronic devices or some combination thereof. In some embodiments, the communication system 102 may be a computing device that includes one or more processors and a memory which may contain software applications executed by the processors. The communication system 102 may include or be in communication with one or more microphones 122 or other audio input components for accepting speech input on which to perform speech recognition. The communication system 102 may also include an AEC module 120 (e.g., a separate AEC module 120 for each microphone 122) to cancel acoustic echoes in the audio signal obtained from the microphone 122. Advantageously, the AEC module 120 may include a noise generator configured to add a predetermined or dynamically determined random noise to a reference signal path and to the microphone output, as described in greater detail below. In some embodiments, the noise generator may be separate from the AEC module 120, such as when a communication system 102 uses or is associated with multiple microphones 122 and AEC modules 120. For example, there may be one random noise generator that provides random noise to all AEC modules 120.

Additional hardware and/or software modules or components of the communication system 102 may include an ASR module 124 for performing speech recognition on an audio signal that corresponds to a user utterance. For example, the user 106 can issue spoken commands to the communication system 102 in order to get directions, listen to music, query a data source, dictate a document or message, or the like. The communication system 102 may also include a network communication module 126 for establishing communications over wireless communication networks or directly with other computing devices. For example, a user 106 may use the communication system 102 to stream audio or video content from a network-accessible content provider for presentation on, e.g., a presentation device 104.

Illustratively, the communication system 102 may be (or be part of) a personal computing device, laptop computing device, hand held computing device, terminal computing device, server computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

In some embodiments, the ASR module 124 may be part of a network-accessible system in communication with the communication system 102 via a communication network, such as a cellular telephone network or the Internet. A user 106 may use the communication system 102 to submit utterances, receive information, and initiate various processes, either on the communication device 102 or at the spoken language processing system. For example, the user can issue spoken commands to the communication system 102 in order to get directions, listen to music, query a data source, dictate a document or message, or the like.

The communication system 102 may include, or communicate with, a presentation device 104. The presentation device 104 may present audio content, audiovisual content, or some other content obtained from the communication system 102 or some other source. For example, the presentation device 104 may be a speaker integrated into the communication system 102, a separate speaker or group of speakers, a television, a home entertainment system, or the like.

Figure 4:
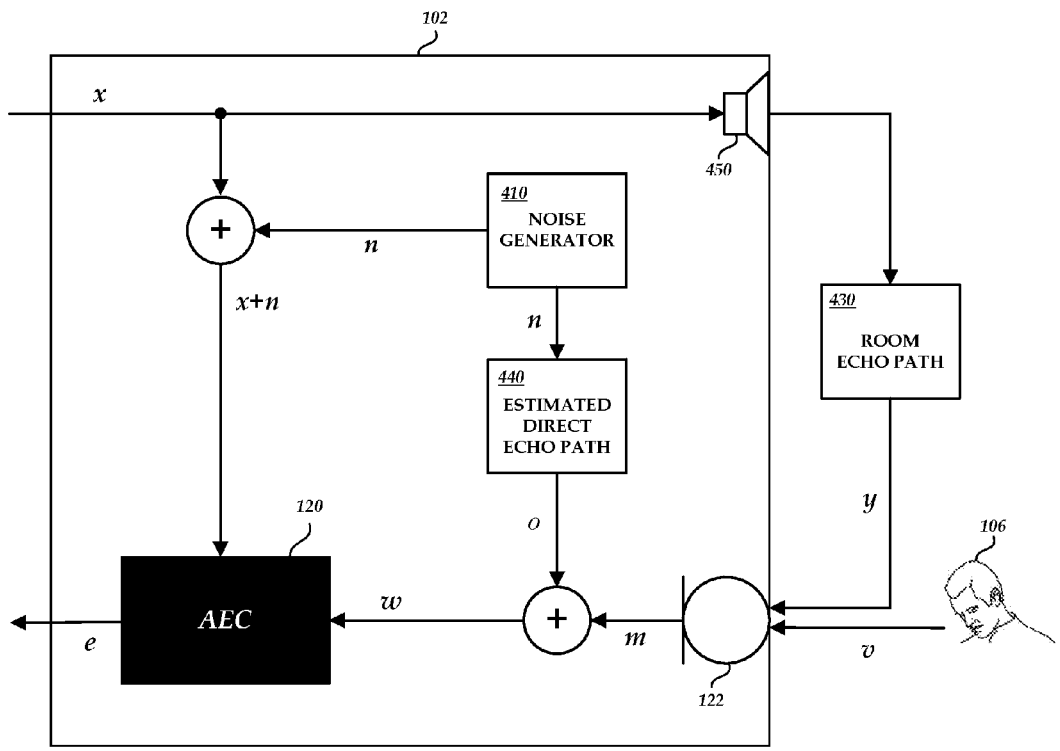
FIG. 4 is a signal diagram of illustrative relationships between signals used to perform acoustic echo cancellation with random noise.

In one illustrative example, the AEC module 120 may be trained using random noise at (A). For example, a user may power on a device for the first time. No reference signal may be available, because the user is not using the system yet to present content. However, random noise, such as white noise, pink noise, Gaussian noise, etc. may be added to the reference signal path of the AEC. From the point of view of the AEC, a reference signal is available. In addition, the same random noise may be added to the output from the microphone 122 that is provided to the AEC. The random noise that is added to the microphone path may be unaltered at first, or it may be passed through a filter such as a finite impulse response ("FIR") filter. The FIR filter can be configured to modify the random noise based on a transform function and coefficients for the transform that model the audio distortion caused by the echo path between the presentation device 104 and the microphone 122. This echo path may be referred to as the "direct echo path." If the presentation device 104 is integrated with the communication system 102 or is otherwise in close proximity to the microphone 122, the coefficients for the transform that models the audio distortions caused by the direct echo path may be determined with a satisfactory degree of accuracy by the manufacturer or developer of the communication system 102. The adaptive filter of the AEC can be automatically trained using a signal from the microphone signal path consisting of the microphone input+the random noise (which may be passed through the FIR filter first) and a signal from the reference signal path, which consists only of the random noise in this example. A detailed description of data flows within a communication system 102, and particularly with respect to an AEC module 120, is shown in FIG. 4 and described in greater detail below.

An audio content signal may be provided to a presentation device 104 at (B). Audio content may include any audio or audiovisual content, such as signal from a remote party to a phone conversation, a radio station, a music stream, an audiovisual stream, etc. The presentation device 104 can present the audio content at (C). The presented audio content may be received by the microphone 122 of the communication system 100 for processing after undergoing modifications due to the local environment, such as reflections around a room, off of a user 106, etc. The specific reflections caused by the local environment may be referred to as the "room echo path."

The AEC module 120 may receive the microphone input at (D), and the adaptive filter may be automatically trained to estimate coefficients of a transform function (or estimate a fast Fourier transform ("FFT") of estimated coefficients) that can be used to partially or completely replicate the distortion caused by reverberations and reflections of the room echo path at (E). As described in greater detail below, an adaptive filter of the AEC 120 can receive a reference signal (e.g., a copy of the audio content signal transmitted to the presentation device 104 for presentation) and a random noise signal. The adaptive filter can automatically adjust the coefficients of its transform so that the output of the filter based on the reference signal and random noise approximates the output of the microphone and the modified random noise. The transform and/or the corresponding coefficients may be referred to as the "estimated room echo path" for simplicity. The process of training the AEC may occur continuously, such that the coefficients are updated whenever there is a change in the local environment (e.g., users entering or leaving a room, objects being added or removed, windows or doors being opened or closed, etc.).

Turning now to FIG. 2, the audio content signal may continue to be provided to the presentation device 104 at (F), or a different audio content signal may be provided at a time subsequent to the interactions illustrated in FIG. 1. The presentation device 104 may present the audio content at (G). During presentation of audio content, a user 106 may make an utterance at (H). In this scenario, the microphone 122 may receive a combination of the presented audio content, which corresponds to the reference signal as modified by the adaptive filter, and utterance audio from the user (and, in some cases, other environmental sound). The AEC module 120 may continue to receive a signal from the reference signal path that consists of a combination of a reference signal corresponding to the audio content signal provided to the presentation device 104 at (F) and random noise. In addition, random noise may be modified by the FIR filter based on the estimated direct echo path to generate an artificial acoustic echo of the random noise. The artificially created acoustic echo of the random noise may be combined with output from the microphone 122 received at (I). After obtaining the combined signal that includes the microphone output, the AEC 120 can then cancel the acoustic echo of the reference signal and the artificially created acoustic echo of the random noise, leaving utterance audio and residual random noise at (J). Advantageously, the residual random noise can dominate environmental sounds and echo cancellation imperfections. The result can be provided to the ASR module 124 at (K).

The ASR module 124 can perform ASR on the utterance audio and residual random noise at (L). The ASR module 124 may be configured to use an acoustic model designed to accurately recognize utterances in the presence of the particular random noise (e.g., the acoustic model is trained on "noisy" data). In some embodiments, the ASR module 124 may not be configured to use an acoustic model that is designed to accurately recognize utterances in the presence of noise, but rather a standard acoustic model (e.g., trained on "clean" data) or a model that is otherwise not designed for use with the random noise generated above. In such cases, a separate model of the random noise may be generated. The two models (e.g., the acoustic model trained on "clean" data and the model of the noise) may be used in conjunction during speech recognition. For example, a vector Taylor series ("VTS") algorithm may be used to perform speech recognition with both models.

Process for Acoustic Echo Cancellation with Random Noise

Figure 3:
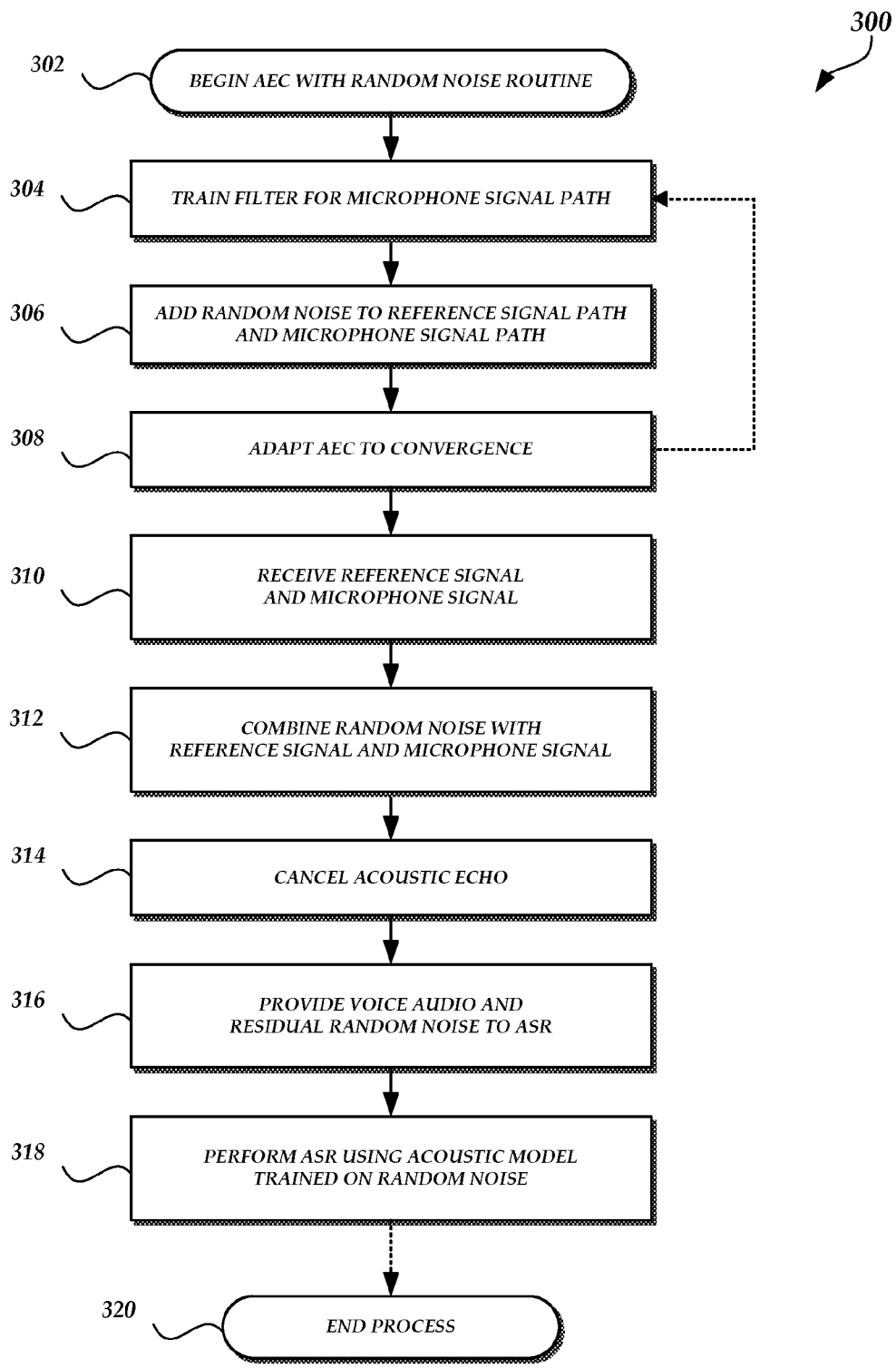
FIG. 3 is a flow diagram of an illustrative process for performing acoustic echo cancellation with random noise to produce output for use in automatic speech recognition.

With reference now to FIG. 3, a sample process 300 for performing acoustic echo cancellation with random noise will be described. Advantageously, an AEC module 120 performing the process 300 can use random noise for continuous training and to remain converged. Utterance audio that is processed by such an AEC module 120 can be scored by an ASR module 124 using an acoustic model trained to recognize speech in the presence of the known random noise. The combination of input from such an AEC module 120 and scoring with an acoustic model specifically trained on such random noise can improve ASR accuracy.

The process 300 begins at block 302. The process 300 may be embodied in hardware, a set of executable program instructions, or a combination of hardware and executable program instructions. FIG. 4 is a signal diagram depicting various components that may be used to perform some or all of the process 300 and other techniques of the present disclosure. Although the process 300 of FIG. 3 will be described with respect to the modules and components of FIG. 4, the process 300 is not limited to implementation by, or in conjunction with, any specific module or component shown in FIG. 4. In some embodiments, the process 300, or some variant thereof, may be implemented by alternative modules or components, by the modules and components of FIG. 4 in a different configuration, etc.

At block 304, a filter for the microphone path of the communication system 102 may initially be trained to modify random noise. The filter may be a FIR filter 440 configured to use coefficients and a corresponding transform to approximate the audio distortion caused by the direct echo path of the communication system 102. In some embodiments, no filter may be used until the adaptive filter of the AEC module 120 estimates or updates the coefficients that it uses to transform the reference signal.

At block 306, random noise may be generated and added to the reference signal path and microphone signal path. The random noise may be continuously generated and added to the respective signal paths even in the absence of a reference signal or a microphone signal. As shown in FIG. 4, noise generator 410 may generate random noise signal n. The random noise signal n may be combined with reference signal x, if any. The same random noise signal n may be provided to the microphone-side FIR filter 440, wherein it is modified using a transform and corresponding coefficients that model the audio distortion caused by the direct echo path (or, in some embodiments, the coefficients and transfer function used by the adaptive filter of the AEC 120 to model the audio distortion caused by the reflections and reverberations of the room echo path). For example, the output of the FIR filter 440 may be denoted o, and obtained by:

$$o=n*\text{est\_direct\_echo\_path} \quad (1)$$

where "*" denotes convolution (e.g., linear FIR filtering) and where "est_direct_echo_path" corresponds to the transfer function and/or corresponding coefficients that model or approximate the audio distortion caused by the direct echo path. If the FIR filter 440 is configured to model audio distortion caused by the room echo path (e.g., after the adaptive filter of the AEC 120 has been trained), the output of the FIR filter 400 may be:

$$o=n*\text{est\_room\_echo\_path} \quad (2)$$

where "est_room_echo_path" corresponds to the transform function and coefficients used to model or approximate the reverberations and reflections that distort audio presented in the local environment. The local environment is denoted room echo path 430 in FIG. 4. The modified noise signal o may be combined with the microphone signal m, if any.

At block 308, the AEC 120 may be adapted based on the noise signal n in the reference signal path and the combination of the microphone output m and the estimated echo of the noise o from the microphone signal path. For example, the coefficients of the transform function used by the adaptive filter of the AEC 120 to model the audio distortion caused by reflections and reverberations of the room echo path (e.g., est_room_echo_path) may be adjusted automatically and continuously by a feedback loop to eliminate any acoustic echo in m+o. As shown in FIG. 3, the process 300 may return to block 304 where the FIR filter 440 for the microphone path may be configured to use the estimated room echo path instead of the estimated direct echo path (e.g., use the transform function and/or coefficients that model the distortion caused by the direct echo path or the room echo path). For example, the transfer function used by the FIR filter 440 may be updated with the estimated room echo path of the adaptive filter of the AEC 120 periodically, such as every 10 seconds, 1 second, 0.5 seconds, etc. Blocks 304, 306, and 308 may be executed in a continuous or substantially continuous loop.

At block 310, the AEC 120 may receive both a microphone input signal m and a reference signal x corresponding to an audio content signal. For example, a user may be watching a movie and also speaking a command. The reference signal x includes the audio of the movie, and the utterance audio signal v includes the user's utterance. Acoustic echo may occur when audio content signal x is emitted from loudspeaker 450 and undergoes various reflections in the local environment according to the actual room echo path, which produces acoustic echo y. Microphone 122 captures both acoustic echo y and an utterance audio signal v from the user 106. The acoustic echo y and the utterance audio signal v together produce microphone signal m. The presence of acoustic echo y in microphone signal m may interfere with the recognition of the utterance in the utterance audio signal v by an ASR module 124.

At block 312, reference signal x and microphone signal m can be combined with the random noise signals that are added to the reference signal path and microphone signal path, respectively, as described above with respect to block 306. In the example of FIG. 4, the noise generator 410 can provide random noise signal n, which is combined with the reference signal x. The combination can be modified by the adaptive filter of the AEC 120 to produce z (not shown):

$$z=\text{est\_room\_echo\_path}*x+\text{est\_room\_echo\_path}*n \quad (3)$$

The noise generator 410 can also provide a random noise signal n to the FIR filter 440, where it is modified to produce signal o, as shown above in equations (1) and (2). Signal o may be added to microphone signal m to produce w:

$$w=m+o \quad (4)$$

Signal z may then be used to cancel the acoustic echo in signal w.

At block 314, the AEC 120 can cancel the acoustic echo in signal w. For example, the estimated echo from the adaptive filter of the AEC 120 may be subtracted from the combined microphone and modified random noise signal to produce an output. In the absence of a voice input, AEC output e may be given by:

$$e=(\text{room\_echo\_path}-\text{est\_room\_echo\_path})*x+(\text{est\_direct\_echo\_path}-\text{est\_room\_echo\_path})*n \quad (5)$$

where room_echo_path is the actual room echo path 430. In the presence of voice input, AEC output may be given by:

$$e=(\text{room\_echo\_path}-\text{est\_room\_echo\_path})*x+(\text{est\_direct\_echo\_path}-\text{est\_room\_echo\_path})*n+v \quad (6)$$

In each of equations (5) and (6), some residual echo of the reference signal x may be present in the AEC output e, depending on the degree to which the coefficients used to model the distortions caused by the room echo path (e.g., est_room_echo_path) accurately model the actual distortions caused by the room echo path (e.g., room_echo_path). Linear random noise will be canceled, but residual non-linear random noise may be present in the AEC output e, depending on the degree that est_direct_echo_path differs from est_room_echo_path. The residual random noise may be desirable due to its ability to mask other residual noise (e.g., from reference signal x) or environmental noise. Equations (5) and (6) may be generalized as:

$$e = w - z \quad (7).$$

The AEC 120 can provide the output signal e to an ASR module 124 at block 316.

At block 318, the ASR module 124 can perform speech recognition on the signal e. The residual random noise present in signal e does not interfere with speech recognition because it does not have the structure of speech. In addition, other residual noises or environmental noises which may interfere with speech recognition (e.g., which may have characteristics of speech) may be dominated by the residual random noise, thereby reducing or eliminating their effect on speech recognition. In some embodiments, the ASR module 124 may use an acoustic model specifically trained to recognize acoustic features of utterances in the presence of the random noise. In some embodiments, as described above, the ASR module 124 may use multiple (e.g., two) acoustic models, such as one model for speech and a second acoustic model for the random noise. In some embodiments, the ASR module 124 may have control over aspects of the random noise, as described below. Therefore, a single AEC 120 may be used with many different ASR systems or implementations, and each ASR system can select or provide its own random noise, depending upon the acoustic model used.

In some embodiments, there may be multiple (e.g., two or more) microphones. Each microphone, or some subset thereof, may be located in a different position (e.g., a different location within the room, or a different location on a communication system 102). Microphones located at different positions may be associated with different estimated room echo paths and/or different direct echo paths. Therefore, the microphones located at different positions may be associated with different AECs 120 (e.g., a different AEC for each microphone) in order to model and adapt the estimated room echo path and estimated direct echo path. In some embodiments, the same reference signal and the same random noise signal may be provided to each AEC 120. The output of two or more AECs 120 may be combined before being sent to the ASR module 124 for speech recognition. In some embodiments, a single AEC 120 output (or a subset of AEC 120 outputs) may be chosen and provided to the ASR module 124. For example, beam selection techniques may be used to select the best output on which to perform speech recognition.

Management of Random Noise

Figure 5:
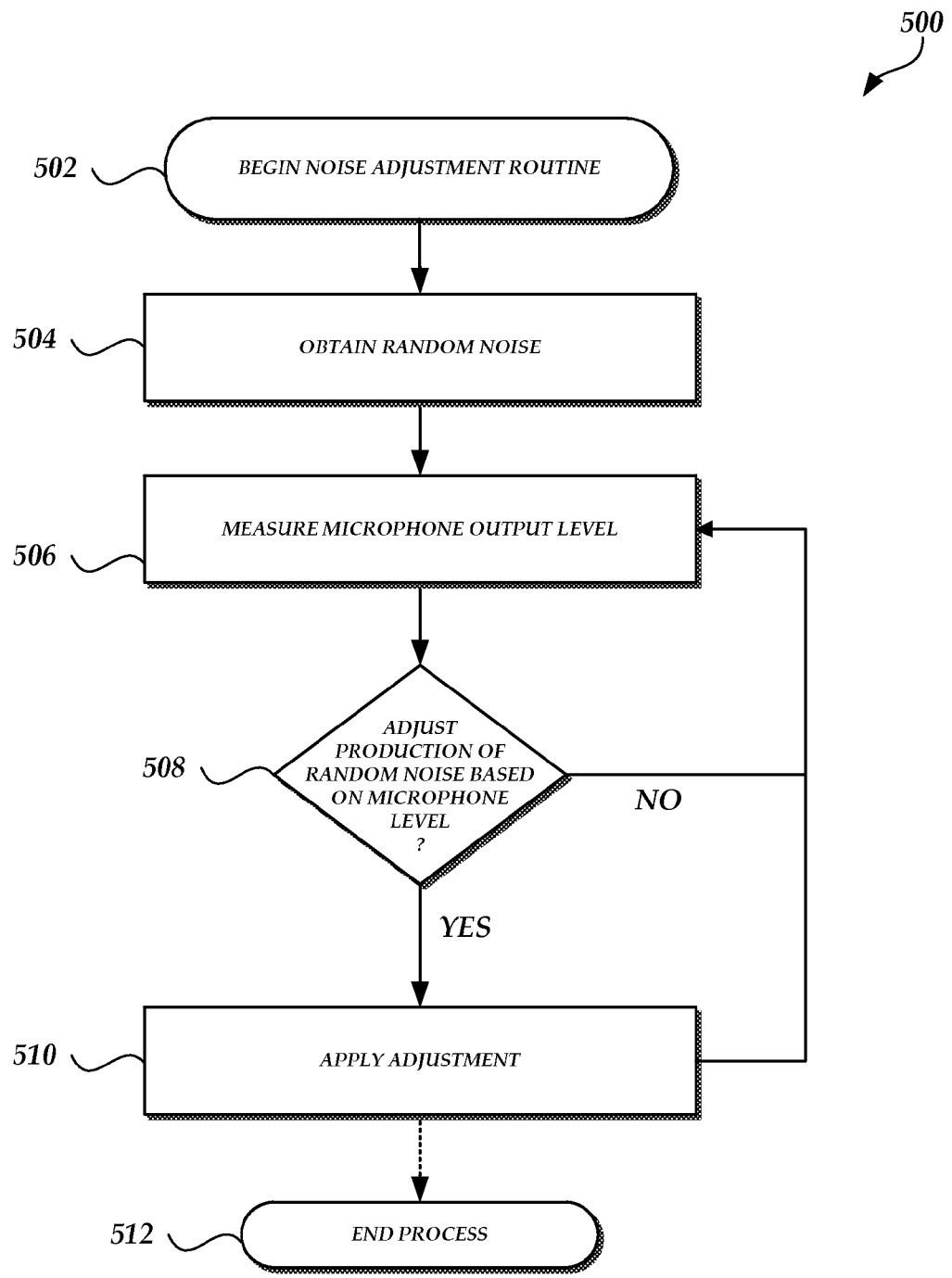
FIG. 5 is a flow diagram of an illustrative process for adding and adjusting random noise for acoustic echo cancellation.

FIG. 5 illustrates a process 500 for managing the use of random noise in acoustic echo cancellation. The process 500 may be used to select or identify the particular noise that is to be used, and to adjust how the noise is used during acoustic echo cancellation.

The process 500 begins at block 502. The process 500 may be embodied in hardware, a set of executable program instructions, or a combination of hardware and executable program instructions. In some embodiments, a set of executable program instructions may be stored on a computer-readable medium, such as one or more disk drives, of a computing system of the communication system 102. When the process 500 is initiated, the executable program instructions can be loaded into memory, such as RAM, and executed by one or more processors of the computing system.

At block 504, an AEC 120 can obtain a random noise. The random noise can be obtained from an ASR module 120. For example, a file or stream can be generated (e.g., by recording or artificially producing the noise). The file can be made available to the noise generator, and the noise generator can play back the noise (e.g., on a continuous loop). In some embodiments, a noise generator may be configured to generate a predefined set of noises. An ASR module 124 can request the use of a particular noise by, e.g., providing an index or identifier of the particular noise. The ASR module 124 may request or provide a particular noise upon power up of the communication system 102, periodically during operation, in response to the occurrence of particular events, etc. As a result, the ASR module 120 (or ASR developers) can have full control over which noise is used.

At block, 506, the noise generator or some other module or component can obtain a measurement of the microphone output level. Illustratively, the measurement may be a measurement of the energy of the microphone signal, such as a decibel level.

At decision block 508, the noise generator or some other module or component can determine whether the current production of random noise should be adjusted. The determination can made with respect to the measurement of the microphone output obtained above. In some situations, it may be desirable to use a lower level of random noise such that important acoustic features of the microphone signal are not obscured by the random noise (e.g., when a user is speaking softly in a quiet room). In some situations, it may be desirable to use a higher level of random noise such that unimportant acoustic features of the microphone signal are obscured or dominated (e.g., when there is a loud environmental noise). For example, if the microphone signal exceeds some threshold or is within some high-end range, then it may be desirable for the random noise to exceed the threshold or be within the high-end range. Similarly, if the microphone signal falls below some threshold or is within some low-end range, it may be desirable for the random noise to fall below the threshold or be within the low-end range. In some embodiments, the specific levels, thresholds, and ranges may be different for the microphone signal and the random noise.

At block 510, the noise generator can apply the adjustment determined above in block 508. The process may terminate at block 512. In some embodiments, measurement of the microphone output level and determination of corresponding adjustments to the random noise may remain executing in a continuous loop.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A device comprising:
    a microphone configured to receive audio and produce an input signal;
    a speaker;
    a random noise generator;
    a memory storing a set of filter coefficients corresponding to a direct path between the speaker and the microphone; and
    one or more modules configured to:
        receive an output signal and generate audio using the output signal and the speaker;
        generate a reference signal by adding a first random noise signal to the output signal, wherein the first random noise signal is received from the random noise generator;
        receive an input signal from the microphone, wherein the input signal corresponds to the audio;
        generate a filtered noise signal by filtering a second random noise signal with the set of filter coefficients, wherein the second random noise signal is received from the random noise generator;
        generate a processed input signal by adding the input signal to the filtered noise signal;
        perform acoustic echo cancellation, using the reference signal and the processed input signal as inputs, to generate an echo-reduced signal, wherein performing the acoustic echo cancellation comprises updating a set of acoustic echo cancellation coefficients; and
        provide the echo-reduced signal to an automatic speech recognition service.

2. The device of claim 1, wherein the one or more modules are further configured to:
    generate a second reference signal using a third random noise signal, wherein the third random noise signal is received from the random noise generator, wherein the second reference signal does not include a signal received from a separate device;
    generate a second filtered noise signal by filtering a fourth random noise signal with the set of filter coefficients, wherein the fourth random noise signal is received from the random noise generator; and
    update the set of acoustic echo cancellation coefficients using the second reference signal and the second filtered noise signal.

3. The device of claim 1, wherein a characteristic of the second random noise signal is based at least on a measurement associated with the input signal.

4. The device of claim 1, further comprising a plurality of microphones.

5. A method comprising:
    receiving a first signal comprising random noise;
    receiving a second signal comprising filtered random noise, wherein the filtered random noise was created using a filter that corresponds to a direct path between a microphone and a speaker; and
    performing acoustic echo cancellation, using the first signal and the second signal as inputs, to generate updated acoustic echo cancellation coefficients.

6. The method of claim 5, wherein the random noise comprises one of:
    white noise, pink noise, or Gaussian noise.

7. The method of claim 5, further comprising performing acoustic echo cancellation without using a signal that includes an output signal for a speaker.

8. The method of claim 5, wherein the first signal further comprises an output signal for a speaker, and wherein the second signal further comprises an input signal from a microphone.

9. The method of claim 8, wherein performing acoustic echo cancellation using the first signal and the second signal comprises generating a third signal, and wherein the acoustic echo cancellation is based at least on the updated acoustic echo cancellation coefficients.

10. The method of claim 9, further comprising performing automatic speech recognition on the third signal.

11. The method of claim 10, wherein performing automatic speech recognition comprises using an acoustic model trained using data based at least on the random noise.

12. The method of claim 5, wherein the random noise is based on information obtained from an automatic speech recognition service.

13. The method of claim 5, further comprising updating the filter based at least on the updated acoustic echo cancellation coefficients.

14. A device comprising:
a noise generator; and
an acoustic echo canceller;
wherein the noise generator generates a first signal comprising random noise,
and wherein the acoustic echo canceller:
receives the first signal;
receives a second signal comprising filtered random noise, wherein the filtered random noise was created using a filter that corresponds to a direct path between a microphone and a speaker; and
performs acoustic echo cancellation, using the first signal and the second signal as inputs, to generate updated acoustic echo cancellation coefficients.

15. The device of claim 14, wherein the first random noise comprises one of: white noise, pink noise, or Gaussian noise.

16. The device of claim 14, wherein the acoustic echo canceller performs acoustic echo cancellation without using a signal that includes an output signal for a speaker.

17. The device of claim 14, wherein the first signal further comprises an output signal for a speaker, and wherein the second signal further comprises an input signal from a microphone.

18. The device of claim 17, wherein performing acoustic echo cancellation using the first signal and the second signal comprises generating a third signal, and wherein the acoustic echo cancellation is based at least on the updated acoustic echo cancellation coefficients.

19. The device of claim 18, further comprising an automatic speech recognition module, wherein the automatic speech recognition module performs automatic speech recognition on the third signal.

20. The device of claim 19, wherein performing automatic speech recognition comprises using a first acoustic model trained using data based at least on speech, and a second acoustic model trained using data based at least on the random noise.

21. The device of claim 14, wherein the random noise is based on information obtained from an automatic speech recognition service.

22. The device of claim 14, wherein the acoustic echo canceller updates the filter based at least on the updated acoustic echo coefficients.

23. The device of claim 14, wherein the noise generator comprises a hardware component that generates the first signal using a file comprising audio data for the random noise, and wherein the acoustic echo canceller comprises an adaptive filter.

* * * * *